United States Patent [19]

Muller

[11] 4,265,063
[45] May 5, 1981

[54] GUARD STRUCTURE FOR HYDRAULIC CONDUITS OF A MOBILE APPARATUS

[75] Inventor: Thomas P. Muller, Aurora, Ill.

[73] Assignee: Caterpillar Tractor Co., Peoria, Ill.

[21] Appl. No.: 98,146

[22] PCT Filed: Jul. 16, 1979

[86] PCT No.: PCT/US79/00501

§ 371 Date: Jul. 16, 1979

§ 102(e) Date: Jul.16, 1979

[51] Int. Cl.$^3$ ............................................. B66C 23/06
[52] U.S. Cl. ..................................... 52/115; 138/110; 137/377
[58] Field of Search .......................... 52/115, 116, 117; 138/110; 285/45; 137/377, 378; 248/66, 68 R, 73, 632, 635; 414/918

[56] References Cited

U.S. PATENT DOCUMENTS

| T974,001 | 9/1978 | Neal | 137/377 X |
|---|---|---|---|
| 2,288,158 | 6/1942 | Ellinwood | 248/632 X |
| 2,967,726 | 1/1961 | Weston . | |
| 3,213,948 | 10/1965 | Eckels . | |
| 3,220,676 | 11/1965 | Butts | 248/635 |
| 4,020,531 | 5/1977 | Ahrens . | |
| 4,030,540 | 6/1977 | Roma . | |
| 4,034,874 | 7/1977 | Collins . | |
| 4,108,224 | 8/1978 | Wirt | 144/34 |

Primary Examiner—Price C. Faw, Jr.
Assistant Examiner—Carl D. Friedman
Attorney, Agent, or Firm—Wegner, Stellman, McCord, Wiles & Wood

[57] ABSTRACT

A mobile apparatus (20) has a hydraulically operated pivoted boom (22) and a hydraulically operated pivoted arm (24) and on the free end of the arm is a hydraulically operated mechanism (26) for handling heavy loads in ways that cause torsional and bending distortion of the boom (22) and the arm (24). Coplanar steel hydraulic conduits (42a and 42b, and 45a and b to 50a and b) are slidably carried in conduit support blocks (57); and those blocks in turn are mounted on brackets (53) fixed to the arm (24) or brackets (69) fixed to the boom (22) by carrying means (56 or 72) which allows directionally unrestricted limited movement of the blocks (57) in a plane parallel to that of the conduit centers, and which also allows axial movement along lines perpendicular to that plane. The guard structure (100 or 101) of the present invention is similarly mounted for limited movement and includes readily removable conduit coupling guard members (104, 107, 108 and 109) to facilitate tightening conduit couplings (43a and b and 50d and e).

18 Claims, 16 Drawing Figures

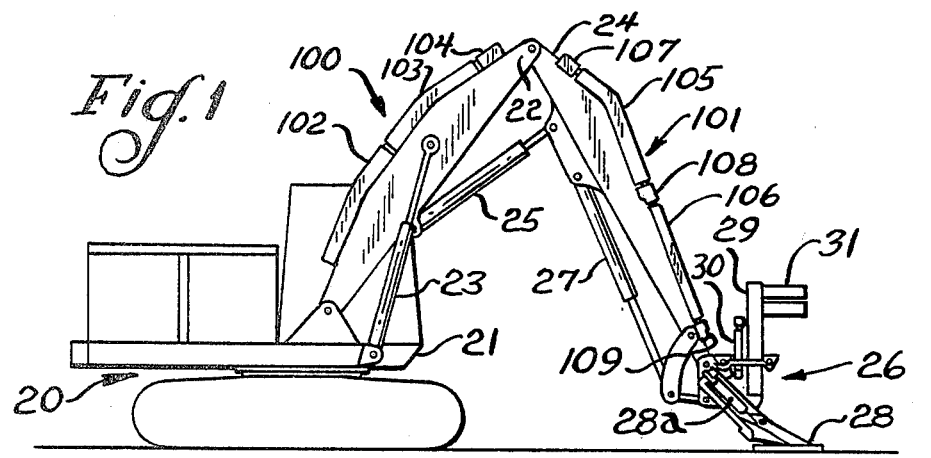
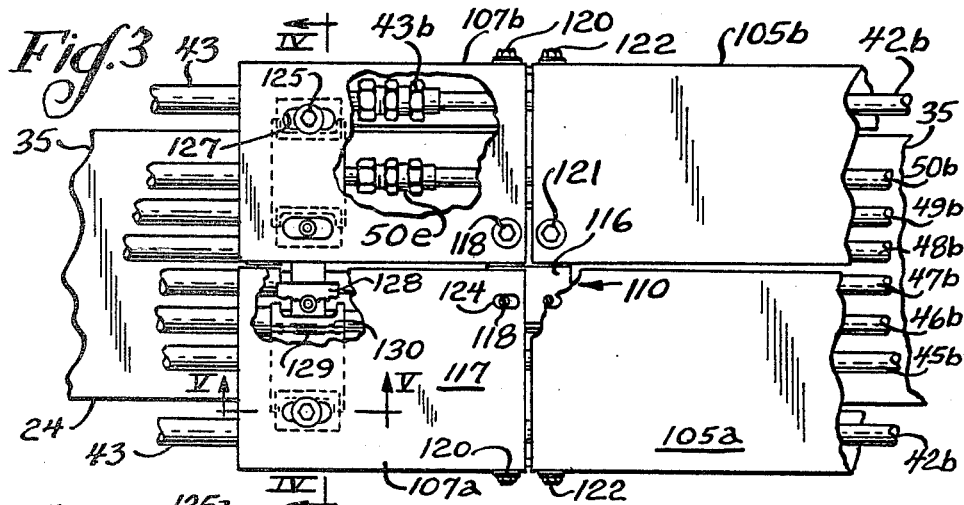
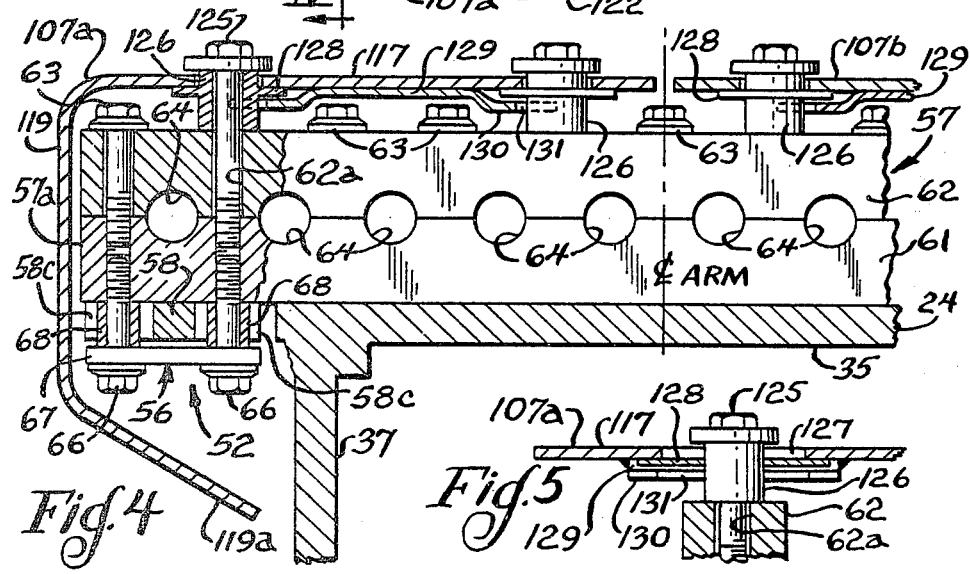

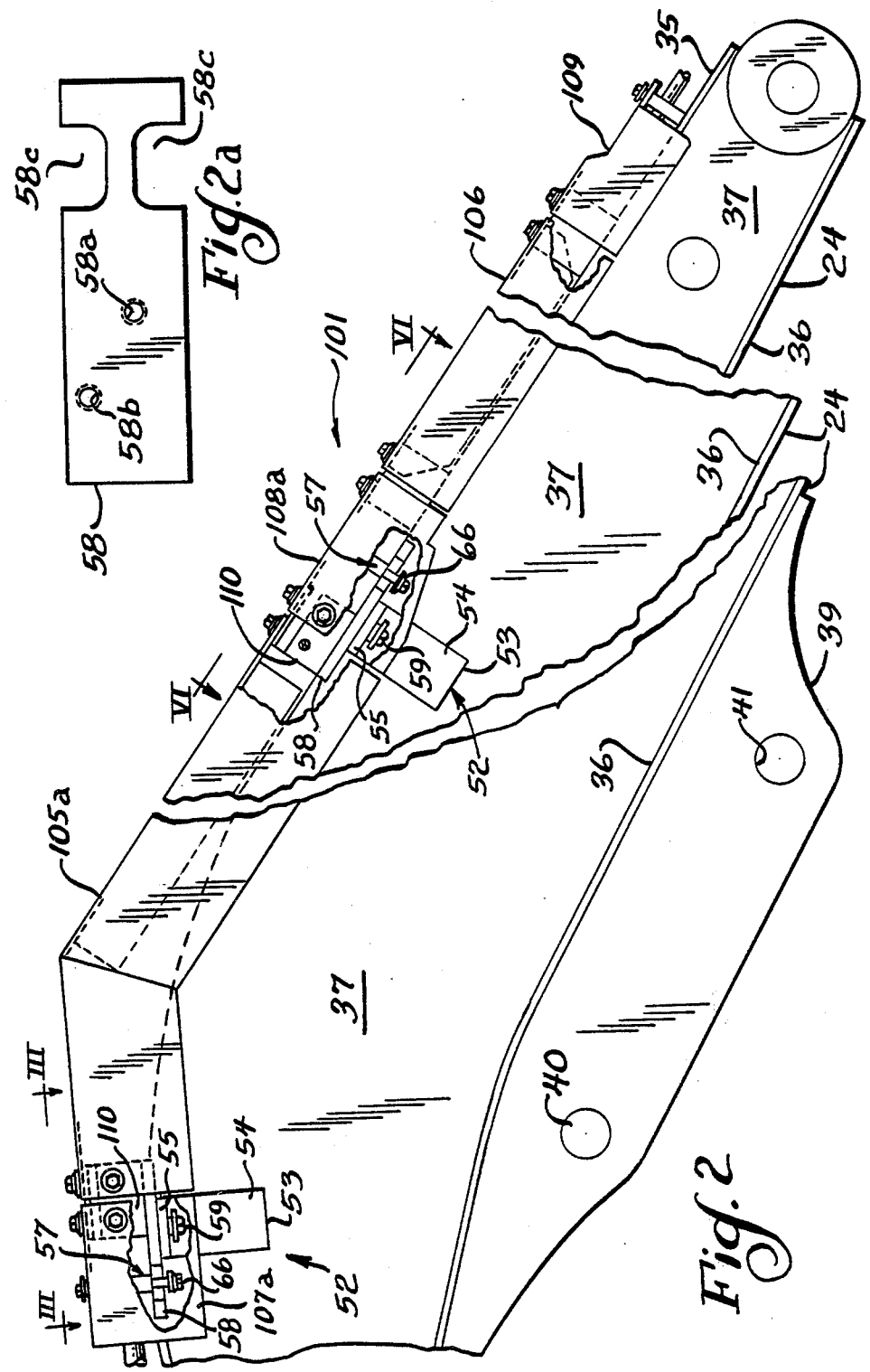

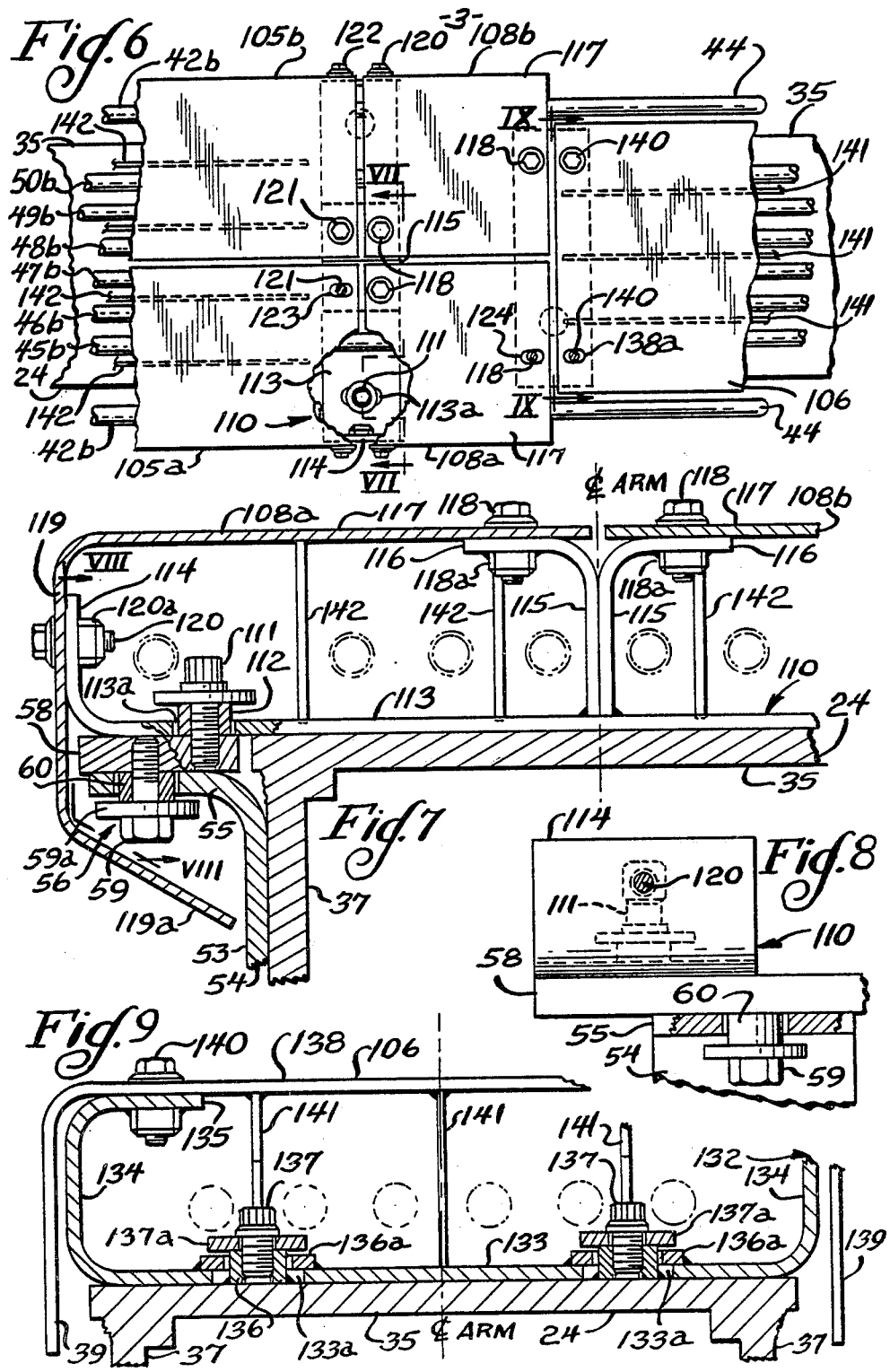

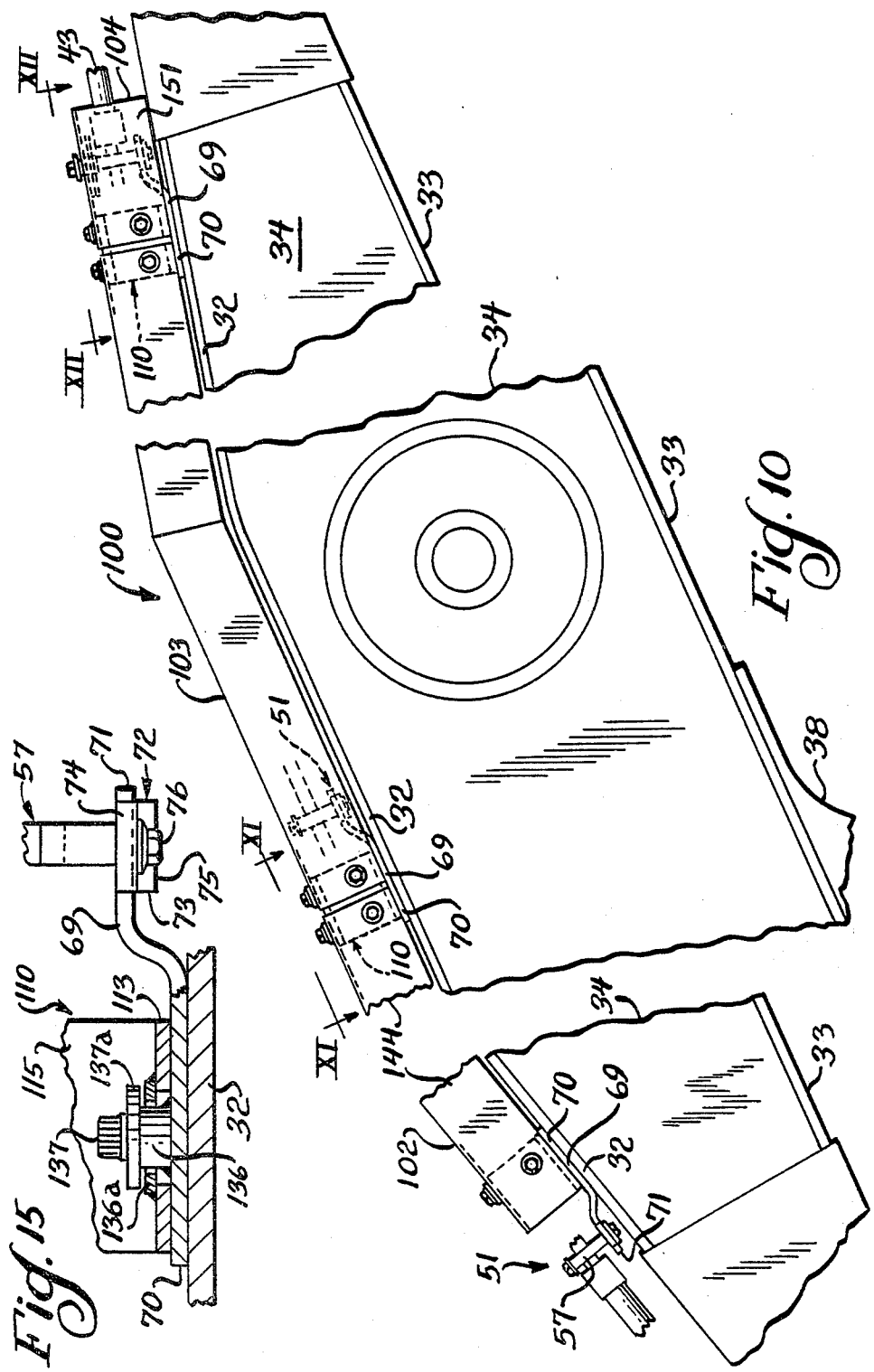

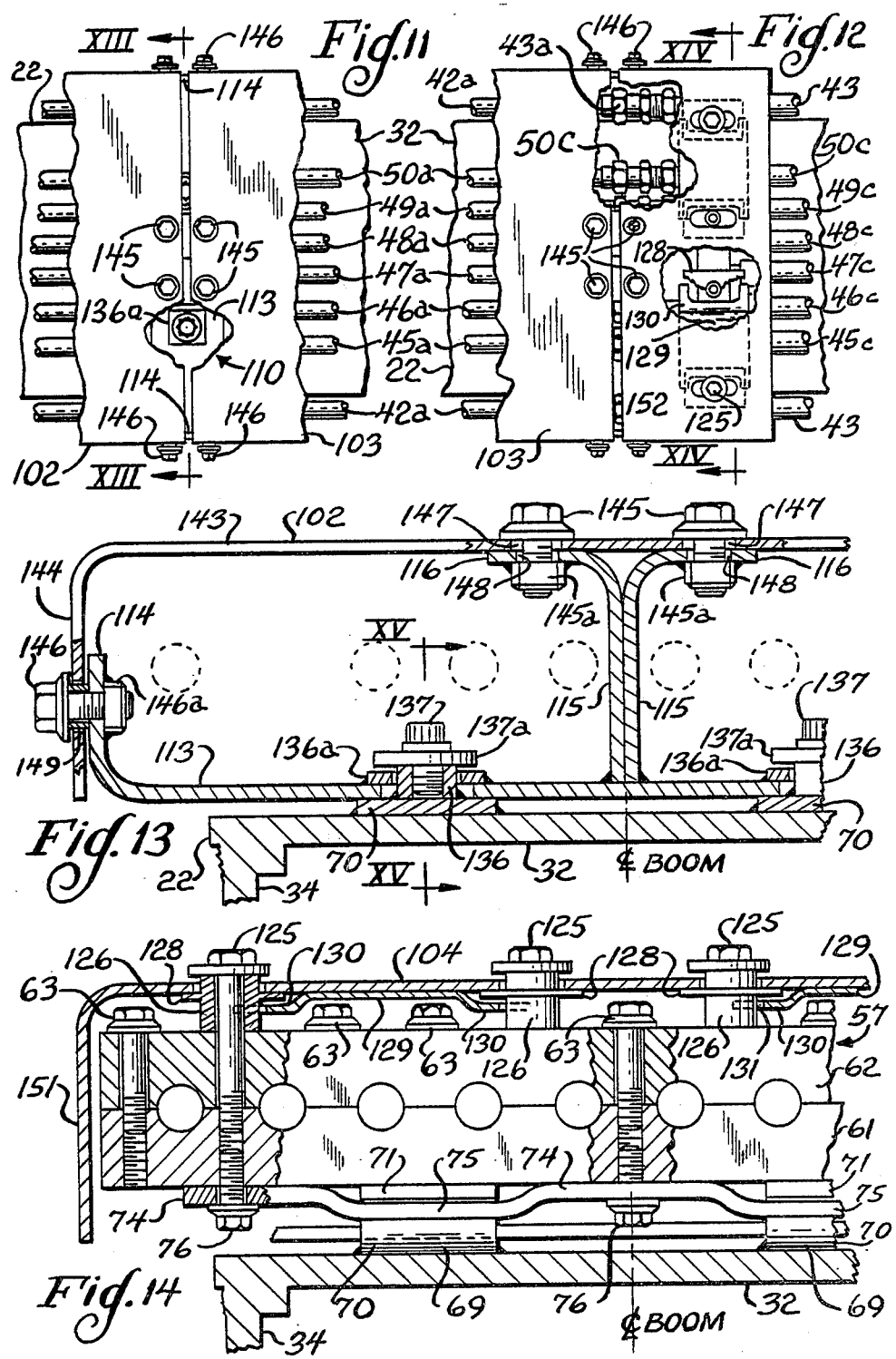

GUARD STRUCTURE FOR HYDRAULIC CONDUITS OF A MOBILE APPARATUS

DESCRIPTION

1. Technical Field

This invention relates to a guard structure for protecting a plurality of rigid hydraulic conduits on a beam member of a mobile apparatus in which a hydraulically operated mechanism on the free end of the beam member is used for handling heavy loads.

2. Cross Reference to Related Application

The mounting assembly for hydraulic conduits, much of which is disclosed herein but not claimed, is disclosed and claimed in copending application for U.S. Letters Patent Ser. No. 098,144, filed July 16, 1979.

3. Background Art

There are various types of mobile devices which are used for handling, or manipulating heavy loads. Many of them, like hydraulic excavators, have a chassis on which a boom member is pivotally mounted, there is an arm member pivoted at the free end of the boom, and an excavator bucket or other hydraulically operated apparatus is at the free end of the arm. Hydraulically operated mechanisms mounted on such devices in place of excavator buckets include tree harvesting devices, log grapples, hydraulic impact hammers, pile drivers or earth compactors, etc. Hydraulic conduits must be mounted on the boom and the arm.

Such devices are usually used in very rough environments in which heavy objects may fall onto the boom or the arm, making a conduit guard structure an indispensable part of the apparatus. In addition, the hydraulic conduits and the guard structure on the boom and on the arm are subject to severe stresses; and particularly with such attachments as tree harvesters and log grapples the boom and the arm may be subjected to severe torsional strain which can twist the guards and damage the conduits. In addition, the heavy vibrations developed in such apparatus cause metal fatigue in the conduits and loosen conduit connections. These factors, plus the rough conditions of use, complicate the development of appropriate conduit and guard structure and guard mountings for the boom and the arm. The rigid hydraulic conduits and the steel guard structure must be firmly supported, but they must be free to move slightly in all directions relative to the boom, or the arm, as the case may be, to minimize conduit damage and connection problems, and guard damage in operation.

In addition, adjustment of a conduit coupling requires removal of the guard, which in the prior art commonly consisted of a one-piece guard for the boom and a one-piece guard for the arm.

DISCLOSURE OF INVENTION

The present invention is directed to overcoming one or more of the problems as set forth above.

According to the present invention, a mobile apparatus having a hydraulically operated, pivotally mounted beam means which carries a hydraulically operated mechanism for handling heavy loads has a mounting assembly for mounting a plurality of rigid hydraulic conduits on the beam means. A conduit guard structure includes long primary guard members and small coupling guard members, and mounting assemblies for the guard structure permit directionally unrestricted limited movement of each guard member in a plane, and axial movement of each member perpendicular to said plane.

As used in the present specification and claims, the word "movement" means relative movement between conduit or guard mountings and an arm or boom. The beams and any rigidly attached brackets move, while the conduit and guard mountings on the boom remain relatively stationary with respect to one another, as do those on the arm.

The term "pivotally mounted beam member" is used generically herein to refer to either the boom member or the arm member of a device such as a hydraulic excavator, or to any other pivotally mounted beam, arm or boom of an apparatus which is used under conditions that subject that member to stresses that tend to damage rigid conduits and conduit connections and conduit guard structures and their mountings.

BRIEF DESCRIPTION OF DRAWINGS

FIG. 1 is a schematic side elevational view of a tree harvesting apparatus supplied with the guard structure of the present invention;

FIG. 2 is a fragmentary side elevational view of the arm beam member, with parts broken away, showing parts of the conduit mountings, the guard structure, and parts of the mounting for the guard structure;

FIG. 2a is a plan view of a mounting member which is a part of each conduit and guard mounting;

FIG. 3 is a fragmentary plan view, with parts broken away, taken substantially as indicated along the line III—III of FIG. 2;

FIG. 4 is a fragmentary sectional view on an enlarged scale taken substantially as indicated along the line IV—IV of FIG. 3;

FIG. 5 is a fragmentary sectional view taken substantially as indicated along the line V—V of FIG. 3;

FIG. 6 is a fragmentary plan view taken substantially as indicated along the line VI—VI of FIG. 2;

FIG. 7 is a fragmentary sectional view on an enlarged scale taken substantially as indicated along the line VII—VII of FIG. 6;

FIG. 8 is a fragmentary sectional view taken substantially as indicated along the line VIII—VIII of FIG. 7;

FIG. 9 is a fragmentary sectional view on an enlarged scale taken substantially as indicated along the line IX—IX of FIG. 6;

FIG. 10 is a broken, side elevational view of the boom beam, showing the three guard member junctions seen in FIG. 1;

FIG. 11 is a fragmentary plan view taken substantially as indicated along the line XI—XI of FIG. 10;

FIG. 12 is a fragmentary plan view taken substantially as indicated along the line XII—XII of FIG. 10;

FIG. 13 is a fragmentary sectional view on an enlarged scale taken substantially as indicated along the line XIII—XIII of FIG. 11;

FIG. 14 is a fragmentary sectional view taken substantially as indicated along the line XIV—XIV of FIG. 12; and FIG. 15 is a fragmentary sectional view taken substantially as indicated along the line XV—XV of FIG. 13.

BEST MODE FOR CARRYING OUT THE INVENTION

Referring first to FIG. 1 of the drawings, the apparatus of the present invention is illustrated as applied to a tree harvester of the kind disclosed in U.S. Pat. No.

4,108,224, owned by applicant's assignee. A tracktype vehicle, indicated generally at 20, includes a frame 21 upon which a boom beam (hereinafter usually termed a "boom") 22 is pivotally mounted; and a hydraulic cylinder 23 permits an operator to selectively raise and lower the boom. Pivoted on the free end of the boom 22 is an arm beam (hereinafter generally called an "arm") 24, which is movable about its pivotal connection on the boom 22 by means of a hydraulic cylinder 25. Pivotally mounted at the free end of the arm 24 is a tree harvesting mechanism, indicated generally at 26, the angular aspect of which relative to the arm 24 is controlled by a hydraulic cylinder 27. The tree harvesting mechanism 26 has various hydraulically operated components such, for example, as a shear 28 operated by cylinder 28a, a tiltable frame 29 controlled by a hydraulic cylinder 30, and hydraulically operated grapples 31. In operation, the tree harvesting apparatus 26 first grips a tree by the grapples 31, then shears it by the shear 28; and appropriate manipulations of the frame 21, the boom 22, the arm 24 and the tree harvesting apparatus 26 permit an operator to place the tree in a horizontal position alongside the machine where it may be part of a pile of several trees. A tree harvester may be used for handling trees as much as 100 feet tall, so the harvesting apparatus 26 handles very heavy loads which provide a great deal of overhung weight that tends to torsionally distort the boom and the arm in such a way as to place strains upon the hydraulic conduits which are necessary to control operation of the cylinders 27, 28a and 30, and the cylinders for the grapples 31, and also upon a guard structure for the conduits and upon the mountings for the conduits and the guard structure.

As seen in FIGS. 10 to 14, the boom 22 is in the form of a box-like beam having a top plate 32, a bottom plate 33, and side plates such as the plate 34. As best seen in FIGS. 2 to 4, the arm 24 is also in the form of a box-like beam having a top plate 35, a bottom plate 36 and side plates 37. A bearing boss 38 on the boom bottom plate 33 receives one end of the arm control cylinder 25; while a pair of webs 39 on the arm bottom plate 36 provides a bearing mount 40 for the other end of the arm control cylinder 25 and a bearing mount 41 for one end of the tree harvesting apparatus tilt cylinder 27.

Referring further to FIGS. 3 and 12, steel outermost hydraulic conduits 42a on the boom and 42b on the arm have respective couplings 43a and 43b between which are flexible hoses 43 bridging the pivotal connection between the boom 22 and the arm 24; and hoses 44 connect the conduits 42b with the tilt control cylinder 27. Operating fluid for the various hydraulic components of the apparatus 26 flows through steel conduits 45a, 46a, 47a, 48a, 49a and 50a surmounting the boom 22 hoses 45c–50c bridging the pivotal connection between the boom 22 and the arm 24, and conduits 45b–50b surmounting the arm 24. At the ends of the conduits 45a–50a and 45b–50b are couplings such as the couplings 50d and 50e in FIGS. 3 and 12. Other couplings are omitted from FIGS. 3 and 12, and also from FIGS. 2, 6 and 10, for clarity.

All the above identified hydraulic conduits and couplings are supported upon mounting means of two types which also provide part of the mounting for the guard structure of the present invention, indicated generally at 100 and 101 in FIGS. 1, 2 and 10. The guard structure 100 on the boom 22 consists of two boom guard members 102 and 103 and a small boom coupling guard member 104. As best seen in FIGS. 2, 3 and 6, the guard structure 101 on the arm consists of a pair of arm guard members 105a and 105b, a first pair of small arm coupling guard members 107a and 107b at one end of 105a and 105b, and a second pair of small arm coupling guards 108a and 108b at the other end of 105a and 105b. The guard structure 101 also includes an outer arm guard 106 and an outermost arm coupling guard 109.

One type of mounting means, indicated generally at 51 in FIGS. 10, 14 and 15, supports the conduits and guard structure 100 upon the boom 22; while another type, indicated generally at 52 in FIG. 4, supports the conduits and guard structure 101 upon the arm 24.

Referring now particularly to FIG. 7, the mounting means of the type 52 includes L-shaped bracket means 53 on the side plates 37 of the arm 24, each of said bracket means including a mounting arm 54 welded to the side plate 37 and a laterally outwardly extending horizontal arm 55 the top surface of which is located a short distance below the top surface of the arm top plate 35.

Supported upon the bracket arms 55 are carrying means, indicated generally at 56 (FIGS. 4 and 7), which carry a hydraulic conduit support block, indicated generally at 57, and guard carrying brackets, indicated generally at 110.

The carrying means 56 includes a mounting member 58 which is seen in FIG. 2a to have a mounting bolt hole 58a which is tapped to receive a threaded flanged mounting bolt 59 for the member 58. The shank of the bolt 59 extends through a spacer collar means 60 the length of which is best seen in FIG. 7 to be slightly greater than the thickness of the bracket arms 55. A second bolt hole 58b in the mounting member 58 receives a flanged mounting bolt 111 the shank of which extends through a spacer tube 112 for mounting the guard carrying bracket 110. Toward one end of the mounting member 58 are clearance recesses 58c.

Each of the hydraulic conduit support blocks 57 includes a lower block member 61 and a matching upper block member 62 which are joined by bolts 63 which traverse oversized bores 62a in the upper block member 62 and screw into threaded bores 61a in the lower block member 61. The block members have confronting semicircular recesses which cooperate to define transversely spaced holes 64 which receive the conduits for endwise sliding movement. As best seen in FIGS. 3 and 4, the hydraulic conduit support blocks 57 have end portions 57a which extend outwardly above the clearance recesses 58c of the mounting members 58.

Still referring to FIG. 4, which shows one of the two identical outer end portions 57a of the hydraulic conduit support block 57, the threaded bores 61a in the outer end portion of the bottom support block member 61 are aligned with the clearance recesses 58c on opposite sides of a center web of the mounting member 58 which is between the clearance recesses, and said outer end portion of the bottom support block member 61 rests upon that center web. The carrying means 56 also includes a pair of headed bolts 66 which extend through holes in a spacer bar 67 that are somewhat larger in diameter than the bolt shanks, and also through spacer sleeves 68 into the lower parts of the threaded bores 61a in the end portions 57a of the conduit support block 57.

From the foregoing description of the mounting of the hydraulic conduit support blocks 57 it is seen that each of the bolts 59 and spacer collars 60 connects a mounting member 58 to one of the pair of aligned arms 55 for limited vertical movement that is permitted by the space between a bolt flange 59a of the bolt 59, and the underside of the arm 55. In addition, the connection of the support blocks 57 to the mounting members 58 provides for limited vertical movement between the spacer bars 67 and the underside of the mounting member 58, and for limited movement of the bolts 66 about their centers to the extent permitted by the difference in diameter between the bolt shanks and the larger holes in the spacer bars 67 through which they extend. Accordingly, such limited movement of the bolts 66 is directionally unrestricted, so each end of the support blocks 57 is free to move in a plane that is parallel to the axes of the holes 64 in the conduit support blocks 57. In addition, the spacer sleeves 68 are seen in FIG. 4 to be somewhat longer than the thickness of the mounting member 58, so the conduit support blocks 57 may also move along the axes of the bolts 66. Thus the complete mounting assembly, including the bolts 59 and spacer collars 60, and the bolts 66, spacer bars 67 and spacer sleeves 68 allows for restricted axial movement in two different planes each of which is transverse to the plane of directionally unrestricted movement.

Referring now particularly to FIGS. 3 to 9, and first to FIG. 7, the guard carrying bracket 110 consists of a bottom plate 113 which rests upon the top plate 35 of the arm 24 and has upright ends such as the end 114. Holes 113a in the bottom plate 113 are slightly larger than the outside diameter of the spacer sleeves 112 which extend through those holes, so the guard carrying bracket 110 is free to move in a directionally unrestricted manner in the plane of the bottom plate 113 about the axis of the mounting bolts 111, and is also free to move axially with respect to each of the bolts 111. Welded to the bottom plate 113 and extending upwardly on the centerline of the arm 24 are median line brackets 115 which have supporting flanges 116 substantially parallel to the bottom plate 113.

The bracket 110 seen in FIG. 6 supports one end of the second pair of small arm coupling guards 108a and 108b and also supports the adjacent ends of the pair of arm guard members 105a and 105b. The opposite ends of the arm guards 105a and 105b are supported upon an identical guard carrying bracket 110 which also supports one end of each of the first pair of small arm coupling guard members 107a and 107b.

As best seen in FIGS. 4 and 7, each of the small arm coupling guard members 107a, 107b, 108a and 108b consists of a top plate 117 which is secured by a bolt 118 and welded nut 118a to one side of the median bracket flanges 116, and there is also a guard side plate 119 which is secured by a bolt 120 and a welded nut 120a to one of the bracket upright ends 114. The lower end of the guard side plate 119 has an inwardly inclined lower portion 119a beneath the bolts 59 and 66.

The arm guard members 105a and 105b have cross sections like those of the coupling guard members 107a–107b, 108a–108b; and each guard member 105a and 105b has one end secured to the brackets 110 at its two ends by top bolts 121 and side bolts 122, all of which traverse longitudinally elongated holes such as the holes 123 seen in FIGS. 3 and 6 and screw into welded nuts (not shown) like the nuts 118a and 120a in FIG. 7.

Each of the small arm coupling guard members 107a and 107b is also seen in FIG. 4 to be shaped exactly like the guards 108a and 108b, with top plates 117 and side plates 119 with inturned lower end portions 119a; and the coupling guard members 107a and 107b are secured to a guard carrying bracket 110 by top bolts 118 and welded nuts 118a and by side bolts 120 and welded nuts 102a. As seen in FIG. 3, the coupling guard members 107a and 107b have longitudinally elongated holes such as the hole 124 in FIG. 3 to receive the bolts 118 and 120; and as seen in FIG. 6, the coupling guard members 108a l and 108b also have such longitudinally elongated holes.

Referring now to FIGS. 3 and 4, the coupling guards 107a and 107b are also supported upon a conduit support block 57 by means of flange headed bolts 125 which pass through spacer tubes 126, through the enlarged holes 62a in the upper conduit support block member 62, and screw into the threaded bores 61a in the lower conduit support block member 61.

The spacer 126 seats upon the conduit support block 57 and its upper end extends through a longitudinally elongated opening 127 in the guard top plate 117. A rectangular flange 128 is welded onto the spacer 126, so that two of such flanges 128 support the shield member 107a and two support the shield member 107b. An offset retainer plate 129 is welded to the underside of the guard top plate 117 between two adjacent guard mounting bolts 125, and the two ends of the retainer plate are offset downwardly at 130 and recessed at 131 to partially encircle the two adjacent spacers 126. As seen in FIG. 4, each of the guard mounting bolts 125 cooperates with the bolts 63 in connecting the upper and lower parts of the conduit support block 57.

Referring now to FIGS. 6 and 9, the second side of the small arm coupling guards 108a and 108b and the adjacent end of the guard member 106 are mounted upon another type of guard support bracket, indicated generally at 132, which has a base plate 133, side plates 134, and inturned top flanges 135 which are fabricated from a single shaped piece of sheet stock. The bottom plate 133 is provided with a pair of openings 133a, and threaded hollow bosses 136 are welded to the arm top plate 35 and extend upwardly through the openings 133a. Welded to the top surface of the bracket bottom plate 133 are washers 136a the openings of which are larger in diameter than the threaded bosses 136, so that the bracket 132 has directionally unrestricted, limited movement in the plane of its bottom plate 133. Bolts 137 screw into the threaded hollow bosses 136 and washers 137a beneath the bolt heads overhang the welded-on washers 136a, so that the space between the washers 136a and 137a permits limited movement of the bracket 132 axially of each of the bolts 137.

The arm guard member 106 has a top plate 138 and a downturned skirt 139 along each side; and fastening bolts 140 extend through elongated holes 138a in the top plate of the guard 106 and screw into complementary nuts which are welded to the undersides of the bracket flanges 135. As seen in FIG. 9, the guard member 106 is provided with longitudinal reinforcing webs 141 which are welded to the underside of the guard top plate 138 and are long enough to rest upon the bottom plate 133 of the bracket 132. Similarly, as seen in FIG. 7, the guard members 105a and 105b have longitudinal reinforcing webs 142.

Turning now to FIGS. 10 to 15, the mounting of the conduits 42a and 45a to 50a and the guard members 102, 103 and 104 upon the boom 22 is shown in detail. In this type of mounting, bracket means 69 includes a mounting arm 70 welded to the top plate 32 of the boom 22, and an upwardly offset horizontal arm 71 the bottom surface of which is in spaced relationship to the boom top plate 32.

Carrying means, indicated generally at 72, support hydraulic conduit support blocks 57.

The carrying means 72 includes a mounting bar 73 which is seen in FIGS. 14 and 15 to have planar portions 74 at the ends and in a central area upon which the hydraulic conduit support block 57 rests; and there are downwardly offset intermediate bracket engaging portions 75 each of which is somewhat wider than the width of the bracket support portion 71 and slightly deeper than the thickness of said support portion.

The carrying means 72 also includes headed bolts 76 which extend through holes 74a in the planar portions 74 of the mounting bar 73 that are larger in diameter than the shanks of said bolts 76 and the bolts are screwed into the bores 61a of the conduit support block bottom member 61. There are holes 74a at each end of the mounting bar 73, and also on the longitudinal centerline of the boom.

The difference in dimensions between the two downwardly offset bracket arm engaging portions 75 of the mounting bar 73 and the bracket arms 71 affords movement of the conduit support block 57 which is of the same general type heretofore described for the conduit support blocks 57 on the carrying means 56. In addition, there can be some lateral shifting of the support blocks.

As seen in FIG. 10, the brackets 69 adjacent the two ends of the boom 22 are mounted with their support arm portions 71 facing in opposite directions, so that each of the brackets 69 limits longitudinal movement of the conduit support blocks 57 in one direction.

Referring now to FIGS. 10 to 15, the mountings for the boom guard members 102 and 103 and the boom coupling guard member 104 are all supported in one way or another upon the bracket means 69 which carries the conduit support blocks 57. As seen in FIGS. 11 and 13, adjacent ends of the boom guard 102 and 103 are supported upon brackets 110 identical to those illustrated in FIG. 7 and heretofore described. The bottom plate 113 of the bracket 110 rests upon mounting arms 70 of a pair of the bracket means 69; and the connection of the bracket bottom plate 113 to the mounting arm 70 is exactly the same as that illustrated in FIG. 9 for the guard bracket 132. Accordingly, elements in FIG. 13 which are identical with those in FIG. 7 or FIG. 9 are given the same reference numerals without further description. A boom guard 102 has a top plate 143, side plates 144; and mounting of said boom guard is by means of top bolts 145 and side bolts 146. The shanks of the top bolts 145 extend through longitudinally elongated holes 147 in the top plate 143, and through clearance holes 148 in the median brackets 116 and screw into nuts 145a that are welded to the undersides of the median brackets 116. The shanks of the side bolts 146 extend through spacer rings 149 which are loosely received in openings in the guard side walls 144, and the shanks of the bolts 146 also extend through openings in the bracket upright ends 114 and screw into nuts 146a which are welded to the inner faces of the upright bracket ends 114. Similarly, the adjacent end of the boom guard member 102 is secured to the bracket 110 by top bolts 145 and side bolts 146. Likewise, as seen in FIG. 12, the opposite end of boom guard 103 and the end of the boom conduit coupling guard 104 which is adjacent it are both secured to a bracket 110 by means of top bolts 145 and side bolts 146.

Referring now to FIGS. 12 and 14, it is seen that the small coupling guard member 104 is carried upon a conduit support block 57 as well as upon a bracket 110. The coupling guard member 104 has a top plate 150 and side plates 151; and the means for connecting it to the conduit support block 57 is precisely like that seen in FIG. 4. Accordingly, in FIG. 14 the elements which are the same as those in FIG. 4 are given the same reference numerals without further description. The longitudinally elongated slots in the guard top plate 150 through which the spacers 126 extend are numbered 152 in FIGS. 12 and 14.

INDUSTRIAL APPLICABILITY

As previously indicated, the guards and guard mounting means of the present invention, when used in conjunction with rigid hydraulic conduits for devices of the type heretofore described, prevent damage to the conduits and their couplings. Many of the torsional strains exerted upon the pivoted beam means, and much of the vibration, are not transmitted to the guard members because of their floating mounting on the boom and the arm. In addition, the small coupling guard members simplify adjustment or replacement of the conduit couplings.

I claim:

1. In a mobile apparatus (20) having a hydraulically operated, pivotally mounted beam means (22 or 24) a free end of which supports a hydraulically operated mechanism (26) for handling heavy loads, and a plurality of rigid hydraulic conduits (42a or b and 45a or b 50a or b) mounted in a single plane on said beam means (22 or 24) there being couplings (such as 43a and b, and 50c and e) connecting certain of said conduits, a conduit guard structure (100 or 101) and guard mounting means (51 or 52 with 110 etc. or with 125-131, or 110 etc. or 132 etc.), comprising in combination:

a rigid guard member (103 or 105a and b) which has a top and side plates constructed and arranged to span the plurality of conduits (42a or b and 45a and b to 50a or b) nearly from end to end;

a rigid, short coupling guard member (104 or 107a and b or 108a and b) immediately adjacent one end of said rigid guard member, said coupling guard member having a top and side plates constructed and arranged to span the couplings between conduits;

and guard mounting means (51 or 52 with 110 etc. and 51 or 52 with 125-131, or 110 etc. or 132 etc.) mounting each end of said guard member (103 or 105a and b) and each of said coupling guard member (104 or 107a and b or 108a and b) on the beam (22 or 24) so that said ends are free for directionally unrestricted limited movement in a plane of movement parallel to the single plane of said conduits, and for axial movement perpendicular to said plane of movement, said guard mounting means including mounting bolts (125 and 145 or 125 and 118) detachably securing said coupling guard member (104 or 107a and b or 108a and b) to other parts of said mounting means for removal independently of said guard member (103 or 105a and b), said independent removal of said coupling guard member (104 or 107a and b or 108a and b) permitting access to said couplings without disturbing said guard member (103 or 105a and b).

2. The combination of claim 1 in which the guard mounting means includes bracket means (53 or 69)

fixedly mounted on the beam means (22 or 24), and carrying means (56 or 72) on said bracket means.

3. The combination of claim 2 in which said bracket means (53) comprises a pair of aligned arms (55) mounted on and extending laterally outwardly from opposite sides (37) of the beam means (24), and said carrying means (56) comprises two mounting members (58), first bolt (59) and spacer (60) means connecting each said mounting member (58) to one of said arms (55) for limited movement along the axis of each bolt (59) of said first bolt and spacer means, and secong bolt (111) and spacer (112) means connecting opposite end portions of guard bracket means (110) to said mounting members (58) for said directionally unrestricted limited movement about the longitudinal axis of each bolt (111) of said second bolt and spacer means.

4. The combination of claim 2 in which said bracket means (53) comprises a pair of aligned arms (55) mounted on and extending laterally outwardly from opposite sides (37) of the beam means (24), and said carrying means (56) comprises two mounting members (58), first bolt (59) and spacer (60) means connecting each said mounting member (58) to one of said arms (55) for limited movement along the axis of each bolt (59) of said first bolt and spacer means, a hydraulic conduit support block (57) having end portions overlying said mounting members (58), means (66, 67, 68) securing said conduit support block (57) to said mounting members (58), and means (125-130) securing a conduit coupling guard (107a and b) to said conduit support block (57) for said directionally unrestricted limited movement about the longitudinal axis of a bolt (125) of said securing means and for axial movement along said bolt axis.

5. The combination of claim 4 in which the securing means comprises bolts (125) extending through spacers (126) that project through clearance holes (127) in the coupling guard (107a and b), and screwed into threaded holes (61a) in the conduit support block (57), guard supporting flanges (128) on said spacers (126), and retainers (129-130-131) on the underside of a coupling guard (107a and b) that interfit with said guard supporting flanges (128).

6. The combination of claim 2 in which the bracket means comprises a bracket member (69) having a mounting arm (70) abutting and fixed to a top surface (32) of the beam means (22) and an integral support arm (71) substantially parallel to said top surface, and the carrying means (72) comprises a mounting bar (73) which has planar portions (74) and an intermediate downwardly offset bracket arm engaging portion (75) slightly wider than the width of said support arm (71) and spaced from said underside by a distance slightly greater than the thickness of said support arm, a conduit support block (57) seated on said planar portions (74), limiting means (69-69) for restricting movement of said conduit support block (57) longitudinally of the support portion, and means (125-131) securing a conduit coupling guard (104) to said conduit support block (57) for said directionally unrestricted limited movement about the longitudinal axis of a bolt (125) of said securing means and for axial movement along said bolt axis.

7. The combination of claim 6 in which the securing means comprises bolts (125) extending through spacers (126) that project through clearance holes (152) in the coupling guard (104), and screwed into threaded holes (61a) in the conduit support block (57), guard supporting flanges (128) on said spacers (126), and retainers (129-130-131) on the underside of a coupling guard (104) that interfit with said guard supporting flanges (128).

8. The combination of claim 1 in which the guard mounting means for one end of a guard member (102 or 103 or 105a and b) comprises a guard mounting bracket (110) which has a base plate (113), upright side plates (114) and upright median line brackets (115) with diverging top flanges (116), the guard member has a top plate (143 or 117) resting on said top flanges (116) and side plates (114 or 119) bearing against said upright bracket side plates (114), and bolts (118 and 120 or 145 and 146) secure said guard member top plates and side plates to said flanges (116) and bracket side plates (114), respectively.

9. The combination of claim 8 in which the guard mounting means includes a bracket member mounting arm (70) abutting and fixed to a top surface (32) of the beam means (22), and the guard mounting bracket (110) seats upon said mounting arm (70), and bolt (137) and spacer (136-136a-137a) means secure guard mounting bracket (110) to the arm (70) for said directionally unrestricted limited movement about the axis of each such bolt and for said axial movement along each such bolt.

10. The combination of claim 1 in which the guard mounting means comprises a guard supporting bracket (132) which has a base plate (133), upright side plates (134), and coplanar top flanges (135) extending inwardly from said side flanges, bolt (137) and spacer (136-136a-137a) means secure said bracket (132) directly to the beam (24) for said directionally unrestricted limited movement about the axes of the said bolt (137) means and for movement along the axes of said bolt (137) means, and a guard (106) has a top plate (138) bolted to said coplanar top flanges 135.

11. In a mobile apparatus (20) having a hydraulically operated, pivotally mounted beam means (22 or 24) a free end of which supports a hydraulically operated mechanism (26) for handling heavy loads, and a plurality of rigid hydraulic conduits (42a or b and 45a or b to 50a or b) mounted in a single plane on said beam means (22 or 24) there being couplings connecting certain of said conduits, a conduit guard structure (100 or 101) and guard mounting means (51 or 52 with 110 etc. or with 125-131, or 110 etc. or 132 etc.), comprising in combination;

a rigid guard member (103 or 105a and b) which has a top and side plates constructed and arranged to span the plurality of conduits (42a or b and 45a or b to 50a or b) nearly from end to end;

a rigid, short coupling guard member (104 or 107a and b or 108a and b) immediately adjacent one end of said rigid guard member;

and guard mounting means (51 or 52 with 110 etc. and 51 or 52 with 125-131, or 110 etc. or 132 etc.) mounting each end of said guard member (103 or 105a and b) and each end of said coupling guard member (104 or 107a and b or 108a and b) on the beam (22 or 24) so that said ends are free for directionally unrestricted limited movement in a plane of movement parallel to the single plane of said conduits, and for axial movement perpendicular to said plane of movement, said guard mounting means comprising (a) a pair of aligned bracket arms (55) mounted upon and extending laterally outwardly from opposite sides (37) of the beam means (24), and (b) carrying means (56) comprising two mounting members (58), first bolt (59) and spacer (60) means connecting each said mounting member (58) to one of said arms (55) for limited movement along the axis of each bolt (59) of said first bolt and spacer means, and second bolt (111) and spacer (112) means connecting opposite end portions of guard bracket means (110) to said mounting members (58) for said directionally unrestricted limited movement about the longitudinal axis of each bolt (111) of said second bolt and spacer means.

12. In a mobile apparatus (20) having a hydraulically operated, pivotally mounted beam means (22 or 24) a free end of which supports a hydraulically operated mechanism (26) for handling heavy loads, and a plurality of rigid hydraulic conduits (42a or b and 45a or b to 50a or b) mounted in a single plane on said beam means (22 or 24) there being couplings connecting certain of said conduits, a conduit guard structure (100 or 101) and guard mounting means (51 or 52 with 110 etc. or with 125-131, or 110 etc. or 132 etc.), comprising in combination:
a rigid guard member (103 or 105a and b) which has a top and side plates constructed and arranged to span the plurality of conduits (42a or b and 45a or b to 50a or b) nearly from end to end;
a rigid, short coupling guard member (104 or 107a and b or 108a and b) immediately adjacent one end of said rigid guard member;
and guard mounting means (51 or 52 with 110 etc. and 51 or 52 with 125-131, or 110 etc. or 132 etc.) mounting each end of said guard member (103 or 105a and b) and each end of said coupling guard member (104 or 107a and b or 108a and b) on the beam (22 or 24) so that said ends are free for directionally unrestricted limited movement in a plane of movement parallel to the single plane of said conduits, and for axial movement perpendicular to said plane of movement, said guard mounting means comprising
(a) a pair of aligned bracket arms (55) mounted upon and extending laterally outwardly from opposite sides (37) of the beam means (24), and
(b) carrying means (56) comprising two mounting members (58), first bolt (59) and spacer (60) means connecting each said mounting member (58) to one of said arms (55) for limited movement along the axis of each bolt (59) of said first bolt and spacer means, a hydraulic conduit support block (57) having end portions overlying said mounting members (58), means (66, 67, 68) securing said conduit support block (57) to said mounting members (58), and means (125-130) securing a conduit coupling guard (107a and b) to said conduit support block (57) for said directionally unrestricted limited movement about the longitudinal axis of a bolt (125) of said securing means and for axial movement along said bolt axis.

13. The combination of claim 12 in which the securing means comprises bolts (125) extending through spacers (126) that project through clearance holes (127) in the coupling guard (107a and b), and screwed into threaded holes (61a) in the conduit support block (57), guard supporting flanges (128) on said spacers (126), and retainers (129-130-131) on the underside of a coupling guard (107a and b) that interfit with said guard supporting flanges (128).

14. In a mobile apparatus (20) having a hydraulically operated, pivotally mounted beam means (22 or 24) a free end of which supports a hydraulically operated mechanism (26) for handling heavy loads, and a plurality of rigid hydraulic conduits (42a or b and 45a or b to 50a or b) mounted in a single plane on said beam means (22 or 24) there being couplings connecting certain of said conduits, a conduit guard structure (100 or 101) and guard mountings means (51 or 52 with 110 etc. or with 125-131, or 110 etc. or 132 etc.), comprising in combination:
a rigid guard member (103 or 105a and b) which has a top and side plates constructed and arranged to span the plurality of conduts (42a or b and 45a or b to 50a or b) nearly from end to end;
a rigid, short coupling guard member (104 or 107a and b or 108a and b) immediately adjacent one end of said rigid guard member;
and guard mounting means (51 or 52 with 110 etc. and 51 or 52 with 125-131, or 110 etc. or 132 etc.) mounting each end of said guard member (103 or 105a and b) and each end of said coupling guard member (104 or 107a and b or 108a and b) on the beam (22 or 24) so that said ends are free for directionally unrestricted limited movement in a plane of movement parallel to the single plane of said conduits, and for axial movement perpendicular to said plane of movement, said guard mounting means comprising
(a) a bracket member (69) having a mounting arm (70) abutting and fixed to a top surface (32) of the beam means (22) and an integral support arm (71) substantially parallel to said top surface, and
(b) carrying means (72) comprising a mounting bar (73) which has planar portions (74) and an intermediate downwardly offset bracket arm engaging portion (75) slightly wider than the width of said support arm (71) and spaced from said underside by a distance slightly greater than the thickness of said support arm, a conduit support block (57) seated on said planar portions (74), limiting means (69-69) for restricting movement of said conduit support block (57) longitudinally of the support portion, and means (125-131) securing a conduit coupling guard (104) to said conduit support block (57) for said directionally unrestricted limited movement about the longitudinal axis of a bolt (125) of said securing means and for axial movement along said bolt axis.

15. The combination of claim 14 in which the securing means comprises bolts (125) extending through spacers (126) that project through clearance holes (152) in the coupling guard (104), and screwed into threaded holes (61a) in the conduit support block (57), guard supporting flanges (128) on said spacers (126), and retainers (129-130-131) on the underside of a coupling guard (104) that interfit with said guard supporting flanges (128).

16. In a mobile apparatus (20) having a hydraulically operated, pivotally mounted beam means (22 or 24) a free end of which supports a hydraulically operated mechanism (26) for handling heavy loads, and a plurality of rigid hydraulic conduits (42a or b and 45a or b to 50a or b) mounted in a single plane on said beam means (22 or 24) there being couplings connecting certain of said conduits, a conduit guard structure (100 or 101) and guard mounting means (51 or 52 with 110 etc. or with 125-131, or 110 etc. or 132 etc.), comprising in combination:
a rigid guard member (103 or 105a and b) which has a top and side plates constructed and arranged to span the plurality of conduits (42i a or b and 45a or

*b* to 50*a* or *b*) nearly from end to end; p1 a rigid, short coupling guard member 104 or 107*a* and *b* or 108*a* and *b*) immediately adjacent one end of said rigid guard member;

and guard mounting means (51 or 52 with 110 etc. and 51 or 52 with 125–131, or 110 etc. or 132 etc.) mounting each end of said guard member (103 or 105*a* and *b*) and each end of said coupling guard member (104 or 107*a* and *b* or 108*a* and *b*) on the beam (22 and 24) so that said ends are free for directionally unrestricted limited movement in a plane of movement parallel to the single plane of said conduits, and for axial movement perpendicular to said plane of movement, said guard mounting means for one end of a guard member (102 or 103 or 105*a* and *b*) comprising a guard mounting bracket (110) which has a base plate (113), upright side plates (114) and upright median line brackets (115) with diverging top flanges (116), the guard member has a top plate (143 or 117) resting on said top flanges (116) and side plates (114 or 119) bearing against said upright bracket side plates (114), and bolts (118 and 120 or 145 and 146) secure said guard member top plates and side plates to said flanges (116) and bracket side plates (114), respectively.

17. The combination of claim 16 in which the guard mounting means includes a bracket member mounting arm (70) abutting and fixed to a top surface (32) of the beam means (22), and the guard mounting bracket (110) seats upon said mounting arm (70), and bolt (137) and spacer (136-136*a*-137*a*) means secure guard mounting bracket (110) to the arm (70) for said directionally unrestricted limited movement about the axis of each such bolt and for said axial movement along each such bolt.

18. In a mobile apparatus (20) having a hydraulically operated, pivotally mounted beam means (22 or 24) a free end of which supports a hydraulically operated mechanism (26) for handling heavy loads, and a plurality of rigid hydraulic conduits (42*a* or *b* and 45*a* or *b* to 50*a* or *b*) mounted in a single plane on said beam means (22 or 24) there being couplings connecting certain of said conduits, a conduit guard structure (100 or 101) and guard mounting means (51 or 52 with 110 etc. or with 125–131, or 110 etc. or 132 etc.), comprising in combination:

a rigid guard member (103 or 105*a* and *b*) which has a top and side plates constructed and arranged to span the plurality of conduits (42*a* or *b* and 45*a* or *b* to 50*a* or *b*) nearly from end to end;

a rigid, short coupling guard member (104 or 107*a* and *b* or 108*a* and *b*) immediately adjacent one end of said rigid guard member;

and guard mounting means (51 or 52 with 110 etc. and 51 or 52 with 125–131, or 110 etc. or 132 etc.) mounting each end of said guard member (103 or 105*a* and *b*) and each end of said coupling guard member (104 or 107*a* and *b* or 108*a* and *b*) on the beam (22 or 24) so that said ends are free for directionally unrestricted limited movement in a plane of movement parallel to the single plane of said conduits, and for axial movement perpendicular to said plane of movement, said guard mounting means comprising a guard supporting bracket (132) which has a base plate (133), upright side plates (134), and coplanar top flanges (135) extending inwardly from said side flanges, bolt (137) and spacer (136-136*a*-137*a*) means secure said bracket (132) directly to the beam (24) for said directionally unrestricted limited movement about the axes of said bolt (137) means and for movement along the axes of said bolt (137) means, and a guard (106) has a top plate (138) bolted to said coplanar top flanges (135).

* * * * *